United States Patent Office 3,352,864
Patented Nov. 14, 1967

3,352,864
THEOPHYLLINYL-7-n-PROPANE-ω SULFONIC
ACID AND SALTS THEREOF
Pierre J. Guiroy, Paris, France, assignor to Les Laboratoires Bruneau et Cie, Paris, France, a company of France
No Drawing. Filed Oct. 1, 1964, Ser. No. 400,923
Claims priority, application France, Oct. 8, 1963, 949,882; Jan. 7, 1964, 959,572
2 Claims. (Cl. 260—253)

ABSTRACT OF THE DISCLOSURE

This invention is directed to theophyllinyl-7-n-propane-ω-sulfonic acid having the formula set forth below and therapeutically acceptable salts thereof. This compound and its salts may be used as spasmolytic agents and vasodilators of the coronary and brain arteries.

It is an object of the present invention to provide new derivatives of dimethylxanthine; a more specific object is to provide a new acid which is related to theophylline and makes it possible in particular to prepare acid addition salts which are very soluble in water from organic bases.

According to an aspect of this invention there is provided a new compound which is theophyllinyl-7-n-propane-ω-sulfonic acid, having the following formula:

$$\begin{array}{c} H_3C-N-C=O \\ | \quad | \\ O=C \quad C-N-CH_2-CH_2-CH_2-SO_3H \\ | \quad \| \quad \diagdown \\ | \quad \| \quad CH \\ H_3C-N-C-N \diagup \end{array}$$

According to a further aspect of this invention there is provided a method for producing a new acid which comprises reacting theophylline with the internal ester of 3-hydroxy-propanesulfonic acid, in an alkaline aqueous medium, until pH becomes stable, then adding a strong acid in order to precipitate the desired acid.

The following example is illustrative of the process.

Example 19.8 g. (1/10 mole) of hydrated theophylline were heated on the water-bath for several minutes in the presence of 4.0 g. of sodium hydroxide and 50 g. of distilled water. Thereupon 12.8 g. of the internal ester of 3-hydroxy-propanesulfonic acid having the following formula:

$$\begin{array}{c} CH_2-CH_2-CH_2-SO_2 \\ |_____O_____| \end{array}$$

were introduced into the mixture.

The reaction mixture was maintained on a water-bath, the temperature of said mixture being kept between 60° and 80° C., the course of the reaction being watched by making touches on an indicator paper.

The pH, which was initially in the neighbourhood of 13, decreased gradually to neutrality and even to some acidity; the reaction vessel was kept on water-bath until said pH had become stable. At that time, the liquid was clear with an amber-yellow colour.

The mixture was allowed to cool and 12 ml. of pure hydrochloric acid ($d.=1.19$) were added by small portions; theophyllinyl-7-n-propane-ω-sulfonic acid precipitated. After having waited for cooling down to take place, the mixture was kept for a few hours in a refrigerator.

The mixture was filtered on sintered glass, washed with a small amount of cold distilled water and filtered again, the cake produced was separated and the crystals were spread in a crystallization tank, which was placed over sulphuric acid in a vacuum.

The dry product obtained was crystalline and white. It was not possible to determine the melting point thereof; when flung onto a Maquenne block, it decomposed at a temperature in the neighbourhood of 350–360° C., while assuming a strong brown colour (melting point of theophylline: 270–274° C.).

The amount obtained was 26.50 g., the yield being 87.7%.

The molecular weight, viz. 304–305 (theoretical value: 302.3) was determined by acidimetric back titration.

It appears from the saturation curve of theophyllinyl-propanesulfonic acid that the pH passes through an inflexion point in the vicinity of 6–7; furthermore, the sharp variation of pH shows that theophyllinyl-propanesulfonic acid is a strong acid.

Theophyllinyl-7-n-propane-ω-sulfonic acid is sparingly soluble in water, but is soluble in:

alkalis,
ammonia aqueous solutions,
alkali metal carbonates,
alkali metal bicarbonates (with effervescence),
aqueous solutions of piperazine.

It is a strong acid which is insoluble in:

95% ethyl alcohol,
ethyl ether,
chloroform,
benzene,
acetone,
ethyl acetate.

The inorganic salts thereof, more particularly potassium, calcium, magnesium, lithium and ammonium salts, are obtainable by saturating a known weight of theophyllinyl-7-n-propane-ω-sulfonic acid with a calculated amount of the selected base.

The sodium salt is obtained at the first stage of the preparation of theophyllinyl-7-n-propane-ω-sulfonic acid. It is identified through the presence of Na+ cations in the mother-lyes from precipitation of theophyllinyl-7-n-propane-ω-sulfonic acid by hydrochloric acid; said cation is in the chloride state and its presence is easily shown by means of usual reagents.

The acid addition salts from alkaloids such as codeine, ephedrine and papaverine may be obtained in the same way as the inorganic salts: exactly corresponding amounts of the alkaloid base and theophyllinyl-7-n-propane-ω-sulfonic acid are mixed together in a minimum amount of water, then the mixture is heated until dissolution is complete.

For instance, the papaverine salt may be prepared in the following manner: 3.02 g. of theophyllinyl-7-n-propane-ω-sulfonic acid, 3.40 g. of papaverine base and 200 ml. of methylisobutylcarbinol (or 2-methyl-4-pentanol) are placed in a flask then refluxed for ¾ hour; after having allowed to cool down for a few minutes, 0.10 g. of active carbon is added; the mixture is heated again for three quarters of an hour with reflux then filtered while still hot. It is left overnight, a crystallization takes place. The crysals are drained and dried in vacuo, giving 4.75 g. of papaverine theophyllinyl-7-n-propane-7-sulfonate in the form of a white powder which is:

Very soluble in water,
Soluble in hot 2-methyl-4-pentanol,
Insoluble in acetone,
Insoluble in ether,
Insoluble in gasoline,
Insoluble in benzene,
In soluble in toluene,
Insoluble in ethyl acetate.

Yield: About 75%,
Empirical formula: $C_{30}H_{35}O_9N_5S$,
Structural formula:

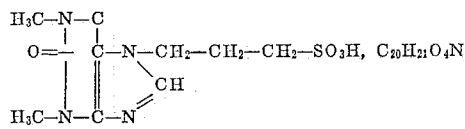

Pharmacological experiments have shown that:

The LD 50 of sodium theophyllinyl-7-n-propane-ω-sulfonate is 160 mg./kg. (mice; intravenous route);
The LD 50 of papaverine theophyllinyl-7-n-propane-ω-sulfonate is 66.7 mg./kg. (mice; i.v. route).

As a comparison, in identical conditions, the LD 50 for theophylline made soluble by means of sodium anisate, is 135 mg./kg. and the LD 50 for papaverine hydrochloride is 32.5 mg. /kg.

Determined on the ileon of guinea-pig, contractured by $BaCl_2$, the spasmolytic action of the sodium salt, as compared to those of theophylline and papaverine hydrochloride, is 12 times weaker than that of papaverine, but stronger than that of theophylline; as to the papaverine salt (equimolecular amounts) it appeared that the spasmolytic action thereof is 1.24 stronger than that of papaverine hydrochloride.

The dilatation activity on coronary blood-vessels was examined on isolated heart, by the Langendorff method.

The activities of the sodium salt and of theophylline are almost identical.
The papaverine salt exhibits an activity equal to that of papaverine hydrochloride.

Both salts showed a slight hyptotensive activity and are mild respiratory and cardiac analeptics.

The above mentioned compounds may be used in therapy as spasmolytic agents and vasodilators of the coronary and brain arteries.

They may be employed in the form of sugar-coated tablets, containing 40 mg. of active substance, of suppositories, containing 80 mg. of active substance and of injectable solutions containing 80 mg. of active substances.

Below is given an example of a sugar-coated tablet:

|  | G. |
|---|---|
| Papaverine theophyllinyl-7-n-propane-ω-sulfonate | 0.04 |
| Starch | 0.0575 |
| Magnesium stearate | 0.0025 |
| White sugar, q.s. for coating. | |

An example of composition for a suppository is as follows:

|  | G. |
|---|---|
| Papaverine theophyllinyl-7-n-propane-ω-sulfonate | 0.08 |
| Cocoa butter, to make up | 2 |

An example of an injectable, liquid composition is as follows:

| Papaverine theophyllinyl-7-n-propane-ω-sulfonate | g | 0.08 |
|---|---|---|
| Distilled water, to make up | ml | 5 |

The theophyllinyl-7-n-propane-ω-sulfonic acid and the salts thereof (including the acid addition salts from bases such as codeine, ephedrine and papaverine) may be administered to provide a total daily dose of about 80 to 240 mg. of the compound, optionally in divided portions, in particular a dose within said range may be provided by 3 to 6 tablets each containing 40 mg. of a compound according to this invention or 1 to 3 suppositories each containing 80 mg. of such a compound or 1 to 2 ampules each containing 80 mg. of said compound.

Instead of administering one of the compounds provided according to this invention, more than one may be administered simultaneously, in particular in the same dosage unit. For example potassium theophyllinyl-7-n-propane-ω-sulfonate may be administered together with acid addition salt from papaverine and theophyllinyl-7-n-propane-ω-sulfonic acid so as to supply more theophylline, for a given dosage of papaverine, than could be supplied by the acid addition salt alone.

What I claim is:
1. A compound selected from the class consisting of theophyllinyl-7-n-propane-ω-sulfonic acid having the formula:

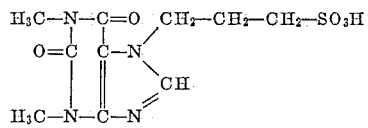

and the pharmaceutically acceptable salts thereof.

2. A compound selected from the class consisting of theophyllinyl-7-n-propane-ω-sulfonic acid, the Na, K, Ca, Mg, Li and $NH_4$ salts of said acid, and the acid addition salts from said acid and from codeine, ephedrine and papaverine.

References Cited

UNITED STATES PATENTS 3,124,579  3/1964  Yoshida et al. _____ 260—253

ALEX MAZEL, *Primary Examiner.*

M. U. O'BRIEN, R. J. GALLAGHER,
*Assistant Examiners.*